United States Patent
Hisatani et al.

(10) Patent No.: US 8,046,101 B2
(45) Date of Patent: Oct. 25, 2011

(54) CLEANING ROBOT SYSTEM AND METHOD OF CONTROLLING SAME

(75) Inventors: Masujiro Hisatani, Chuo-ku (JP);
Hirotaka Oohashi, Chuo-ku (JP);
Kounosuke Oku, Chuo-ku (JP); Jun Tsukada, Chuo-ku (JP); Toru Takehara, Chuo-ku (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 12/737,758

(22) PCT Filed: Nov. 20, 2009

(86) PCT No.: PCT/JP2009/069683
§ 371 (c)(1), (2), (4) Date: Feb. 14, 2011

(87) PCT Pub. No.: WO2010/073860
PCT Pub. Date: Jul. 1, 2010

(65) Prior Publication Data
US 2011/0137458 A1 Jun. 9, 2011

(30) Foreign Application Priority Data
Dec. 26, 2008 (JP) .................................. 2008-335191

(51) Int. Cl.
*G05B 19/418* (2006.01)
(52) U.S. Cl. ........................................................ 700/248
(58) Field of Classification Search .......... 700/247–248; 901/1, 2, 8; 318/568.11, 568.12
See application file for complete search history.

(56) References Cited

U.S. PATENT DOCUMENTS

| 7,076,335 B2 * | 7/2006 | Seemann | 700/248 |
| 2003/0212472 A1 * | 11/2003 | McKee | 700/245 |

FOREIGN PATENT DOCUMENTS

| JP | 06-11131 A | 1/1994 |
| JP | 06011131 A * | 1/1994 |
| JP | 2951297 B2 | 10/1996 |

(Continued)

*Primary Examiner* — Khoi Tran
*Assistant Examiner* — Harry Oh
(74) *Attorney, Agent, or Firm* — Jacobson Holman PLLC (57) ABSTRACT

Provided is a cleaning robot system and a method of controlling the same for economically cleaning, with high workability, plate-shaped members, such as solar cell panels and reflecting mirrors used in photovoltaic power generation and solar thermal power generation systems. A cleaning robot system (1) for cleaning planar or curved plate-shaped members (4*a*), (4*b*) that are panels for photovoltaic power generation or reflecting mirrors for solar thermal power generation includes: a large number of cleaning robots (2) each having a function to travel on each of the plate-shaped members (4) which are to be cleaned and a function to clean the plate-shaped members (4); and an arranging robot (3) having a conveying function to move any of the cleaning robots (2) from a first one (4*a*) of the plate-shaped members to a second one (4*b*) of the plate-shaped members. Each of the cleaning robots (2) has a suction mechanism for performing cleaning while attaching onto one of the plate-shaped members (4), and the large number of cleaning robots (2) and a smaller number of the arranging robots (3) than that of the cleaning robots (2) cooperate together to clean the plate-shaped members (4) placed in a photovoltaic power generation or solar thermal power generation plant.

7 Claims, 3 Drawing Sheets

FOREIGN PATENT DOCUMENTS

| | | | |
|---|---|---|---|
| JP | 08256953 A | * | 10/1996 |
| JP | 08-256953 A | | 4/1999 |
| JP | 2001-63644 A | | 3/2001 |
| JP | 2001063644 A | * | 3/2001 |
| JP | 2001-274597 A | | 10/2001 |

* cited by examiner

CLEANING ROBOT SYSTEM AND METHOD OF CONTROLLING SAME

This is a national stage of PCT/JP09/069683 filed Nov. 20, 2009 and published in Japanese, which claims the priority of Japanese number 2008-335191 filed Dec. 26, 2008, hereby incorporated by reference.

TECHNICAL FIELD

The present invention relates to a robot system for cleaning a glass surface and the like, among service robots or field robots. Particularly, the present invention relates to a cleaning robot system for cleaning power generating elements called as solar panels for photovoltaic power generation, reflecting mirrors used for solar thermal power generation, and the like.

BACKGROUND ART

In recent years, large-scale photovoltaic (solar cells and the like) or solar thermal (photovoltaic collecting systems and the like) power generation systems with power outputs of as much as several hundred thousand kilowatts have been widespread. For example, as the solar thermal power generation systems, which generate electric power by collecting the photovoltaic, a beam-down type solar thermal power generation system has been known (refer to Patent Document 1). In the beam-down type solar thermal power generation system, the photovoltaic is reflected toward an upper side of a center portion of the system by heliostats, which are reflecting mirrors, and the reflected light is collected to a cavity receiver (heat receiving unit) set at a lower side by a large-sized reflecting mirror called as a center reflector.

Figure 3:
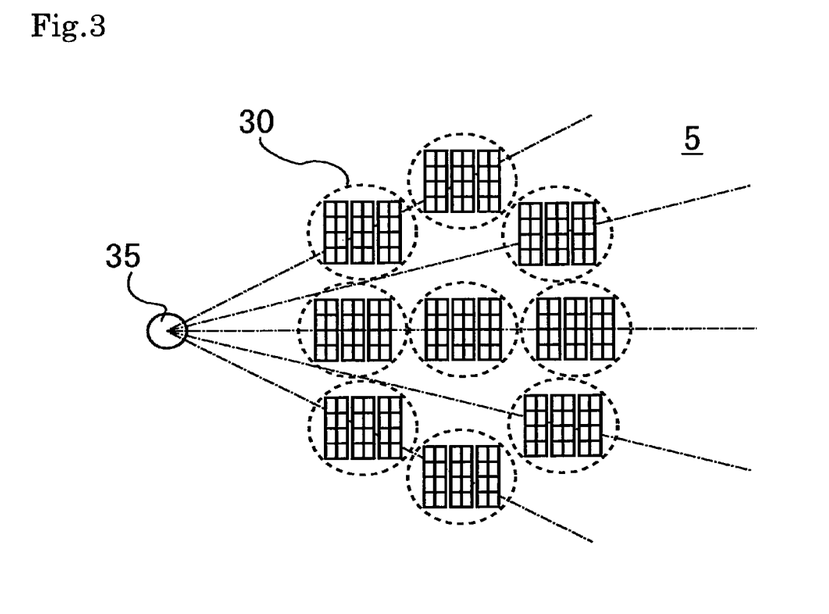
FIG. 3 is a plan view of a beam-down type solar thermal power generation system.

FIG. 3 shows a schematic plan view of a beam-down type solar thermal power generation plant 5. Multiple heliostats 30, which are reflecting mirrors, follow the sun, and collect their reflected light to a center reflector 35, which is a second reflecting mirror. The reflected light thus collected to the center reflector 35 is then concentrated onto, and thereby heats, a heat medium, such as a molten salt, which is circulating in a heat-receiving unit. A power generation system in which the thermal energy of the heat medium thus heated is converted to an electric energy by a steam turbine or the like is an example of the aforementioned solar thermal power generation system.

Figure 4:
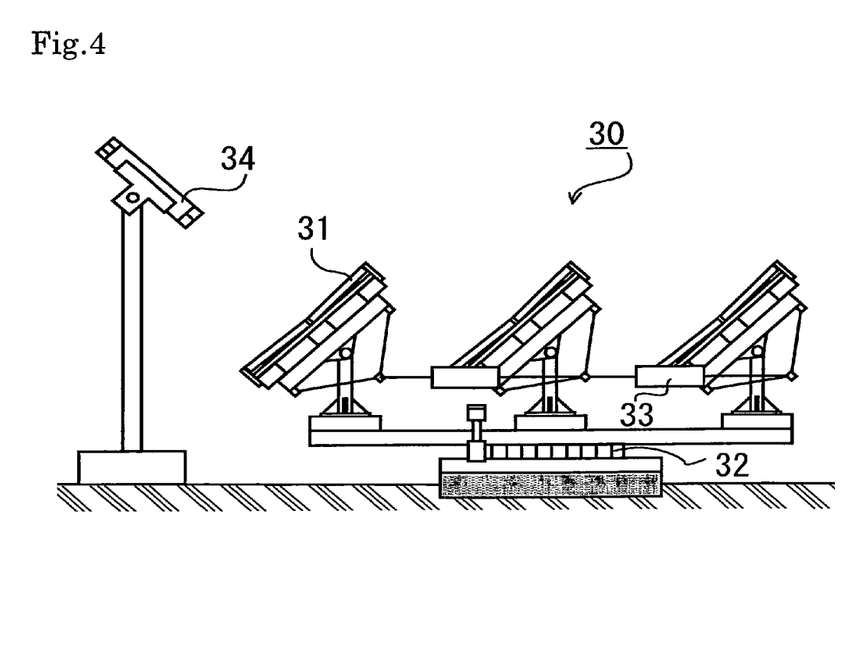
FIG. 4 is a side view of heliostats.
Figure 5:
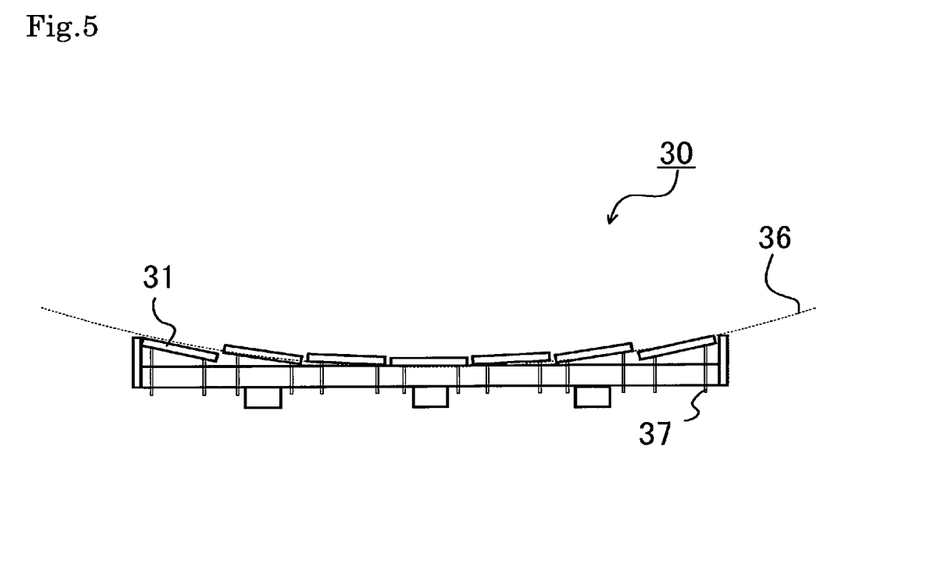
FIG. 5 is a schematic view showing a state of facets in the heliostats.
Figure 6:
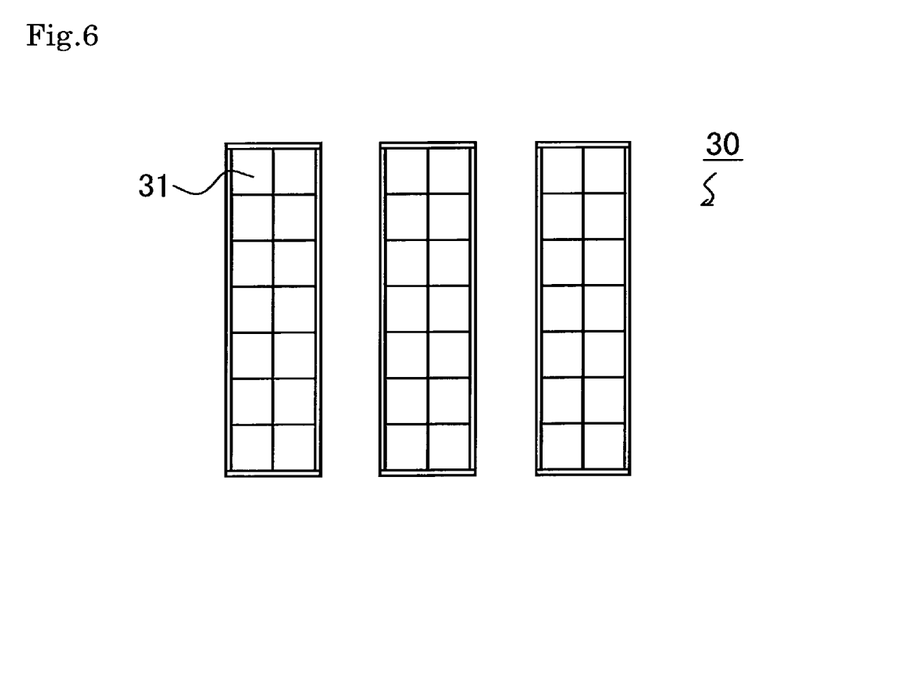
FIG. 6 is a schematic view showing arrangement of the facets in the heliostats.

FIG. 4 is a side view of the heliostats 30. Each of the heliostats 30 is constituted by combining multiple facets 31, which are small reflecting mirrors. In FIG. 4, three heliostats 30 are mounted on a common rotating mechanism 32, and are connected to one another with a tilting mechanism 33. The heliostats 30 are thus configured to automatically track the sun in accordance with a signal from a photovoltaic tracking sensor 34. Each heliostat 30 is configured as follows for the purpose of enhancing the light collection efficiency. As in a cross-sectional view shown in FIG. 5, the angles of the facets 31 can be adjusted by facet adjusting bolts 37 so that the facets 31 should form a pseudo curved surface 36, which is a rotating conical surface. FIG. 6 is a top view of the heliostats 30, and the multiple facets 31 form a reflecting mirror.

A problem has been pointed out that heliostats, which are reflecting mirrors used in the system, or panels of a photovoltaic power generation system get dirty with dust, bird droppings, or the like, so that the power generation efficiency is decreased. However, no countermeasure against the problem has been established yet. At present, a method in which cleaning work is manually performed has been employed. However, this method involves a hard work, and sometimes requires the setting of a scaffold because the work may have to be performed in a high place. For these reasons, this method leads to a decrease in work efficiency and an increase in costs. In addition, the poor workability of this method possibly causes a risk of damaging a glass surface of a reflecting mirror, a panel, and the like. If the power generation systems will be increased in scale further in the future, the problem will tend to become large functionally and economically. The photovoltaic and solar thermal power generation systems are often constructed in desert areas, such as those in the Middle East. For this reason, panels and reflecting mirrors are likely to get dirty with sand dust, and also, the manual work may be difficult because of a high temperature in some case.

In short, these manual cleaning works have the problem of the safety of a worker and the problem of the risk of damaging a glass surface of a panel or a mirror, which is a target of the work. In addition, there is also a problem in which an increase in the scale of a power generation system leads to an increase in cleaning costs in proportion, so that the scale effect cannot be achieved. For the photovoltaic or solar thermal power generation system itself, a larger scale effect can be achieved as the system increases in size, or the power generation costs can be suppressed by the mass production effect. Consequently, as a power generation system is increased in scale, the proportion of maintenance costs required for the cleaning work for the system is relatively increased.

On the other hand, it can be considered that the cleaning work is performed by using a robot. The applicant of the present application filed an application relating to a robot that cleans a window of a building or a glass of an aquarium in the past, and considered to apply a cleaning system remotely operated using a rotary brush extensively to the power generation system (refer to Patent Document 2).

However, when the frequency and absolute amount of the cleaning work are increased along with an increase in the scale of the power generation system, the initial costs for installing a robot are increased because of an increase in the size of the robot and the like. Moreover, the operating costs are increased because of energy consumption of the robot and the remote operation manually conducted, in turn leading to deterioration of the economy. For these reasons, it seems highly likely at the current circumstances that the application of the above-described cleaning system is difficult.

Specifically, if the unit size of solar cell panels or reflecting mirrors is increased along with an increase in the scale of the power generation system (a solar cell panel having a size of 6 m×12 m has already existed), a robot of a single unit type for cleaning these panels or mirrors is increased in size, resulting in a large-sized, very heavy machine (robot) such as a gantry crane, for example. The price (initial costs) of the robot also becomes high. The cleaning work of a panel or a reflecting mirror itself is merely cleaning a glass surface, which does not require the aforementioned robot to have a large output. However, the motive power (operating costs) for moving the robot itself while supporting the weight of the robot is increased to an extent that cannot be ignored. This is inefficient and deteriorates the economy. Further, the remote operation requires manpower, so only the work environment for the worker is improved but the economy is not improved.

Furthermore, robots have to be designed and manufactured separately in conformity with the specifications, such as the size of panels and reflecting mirrors, of individual photovoltaic power generation and solar thermal power generation systems. This is also a cause of an increase in the price of the robots.

PRIOR ART DOCUMENTS

Patent Documents

Patent Document 1: Japanese Patent No. 2951297
Patent Document 2: Japanese patent application Kokai publication No. Hei 08-256953.

SUMMARY OF THE INVENTION

Problems to be Solved by the Invention

The present invention has been made to solve the above-described problems, and has an object to provide a cleaning robot system and a method of controlling the same for economically cleaning, with high workability, plate-shaped members, such as solar cell panels and reflecting mirrors used in photovoltaic power generation and solar thermal power generation systems.

Means for Solving the Problems

A cleaning robot system according to the present invention for achieving the above-described object is a cleaning robot system for cleaning planar or curved plate-shaped members that are panels for photovoltaic power generation or reflecting mirrors for solar thermal power generation. The cleaning robot system is characterized by including: a large number of cleaning robots each having a function to travel on each of the plate-shaped members which are to be cleaned and a function to clean the plate-shaped members; and an arranging robot having a conveying function to move any of the cleaning robots from a first plate-shaped member to a second plate-shaped member. The cleaning robot system is also characterized in that each of the cleaning robots has a suction mechanism for performing cleaning while attaching onto one of the plate-shaped members, and the large number of cleaning robots and a smaller number of the arranging robots than that of the cleaning robots cooperate together to clean the plate-shaped members placed in a photovoltaic power generation or solar thermal power generation plant.

This configuration makes it possible to achieve a reduction in the size of the cleaning robots and a reduction in costs. Specifically, in the cleaning robot system, works are shared to two types of autonomous robots. Each of the cleaning robot automatically performs the cleaning of a plate-shaped member, which is a surface of a panel or a surface of a reflecting mirror, and the traveling on the surface, while the arranging robot automatically performs works, such as the moving of the cleaning robot from the first plate-shaped member for which the cleaning work has been completed to the other second plate-shaped member, the monitoring and grasping of the working statuses of the plurality of cleaning robots, and the communicating with a central management center to report the working statuses and to receive work instructions.

In the central management center, an operator receives a status report from the arranging robot (which may also be provided in plurality in a large-scale system), and gives a work instruction as necessary. Additionally, if an event which cannot be dealt with by the robots occurs, the operator goes to the site of the event and performs necessary works there.

Specifically, since the movement of each cleaning robot between the plate-shaped members is performed by the arranging robot, the cleaning robot only needs to have the cleaning function and the function to travel on each plate-shaped member. The elimination of the function to move between the plate-shaped members, placed at a higher position than the ground surface, makes it possible to achieve reductions in size and costs of the cleaning robot. Therefore, particularly, when the scale of a power generation plant is increased and thus the number of cleaning robots required for the plant is increased, greater cost advantages can be achieved by employing the cleaning robot of the present invention.

In addition, plate-shaped members of panels for photovoltaic power generation and of reflecting mirrors for solar thermal power generation often have a function to track the movement of the sun in order to increase the power generation efficiency, and in most cases, the plate-shaped members are operated in such a state as to have an inclination angle to the ground surface, that is, in such a state as to be tilted. For this reason, providing the suction mechanism to each cleaning robot allows the cleaning robot to be used even during the day time when the power generation is being performed.

Moreover, some plate-shaped members of reflecting mirrors for photovoltaic power generation are curved. Even for such plate-shaped members, the cleaning robot having the suction mechanism can perform cleaning while attaching thereto.

In addition, also for the night time when the plate-shaped members are not engaging in the power generation, the work efficiency of the cleaning work can be improved because of no need to move the plate-shaped members into a horizontal state for the cleaning. It should be noted that, since the cleaning robot system of the present invention can be configured with two or more types of autonomous robots, it is possible to further divide the works performed by robots and to increase the number of types of robots.

The above-described cleaning robot system is characterized in that the suction mechanism is a vacuum suction mechanism for attaching the corresponding cleaning robot onto any of the plate-shaped members by generating a negative pressure between the cleaning robot and the plate-shaped member. This configuration makes it possible to achieve secure attachment with the suction mechanism having a simple structure.

The above-described cleaning robot system is characterized in that the arranging robot has a supply equipment function to supply any of the cleaning robots with water and a cleaning liquid for cleaning the plate-shaped members and energy for traveling and cleaning.

This configuration makes it possible to reduce the size of the cleaning robot and reduce the price thereof (initial costs). Specifically, in addition to the function to move the cleaning robot, the arranging robot is provided with the supply equipment function installed therein for supplying for example, water, a cleaning liquid, and the like and charging electricity to be used as the motive power, which are necessary to clean the plate-shaped member. This makes it possible to achieve a further reduction in the size of the cleaning robot. In particular, in the case of use in a large-scale power generation plant, large amounts of water, a cleaning liquid, and the like are required. Even in such a case, with the arranging robot having the supply equipment, the cleaning robot only has to have water and motive power required for cleaning at least one plate-shaped member. Therefore, the size of the cleaning robot can be further reduced.

The above-described cleaning robot system is characterized by including: a group constituted of one of the arranging robots and a plurality of the cleaning robots; and an aggregation of a plurality of the groups and a management robot managing the plurality of groups. The system is also characterized in that the cleaning of the plate-shaped members in working areas defined in advance within the photovoltaic power generation or solar thermal power generation plant is performed by the aggregation.

With this configuration, each of the arranging robots manages the plurality of cleaning robots, and the management robot manages the plurality of arranging robots. Accordingly, it is possible to manage the entire system in an organic fashion, thereby achieving great economies of scale. Specifically, a large number of working areas are defined in a vast plant for photovoltaic power generation or solar thermal power generation, and the plurality of groups are allocated to the working areas to perform the cleaning work. The management robot makes determination on moving each of the groups to another working area yet to be worked on in accordance with the progress of the cleaning work or the degrees of contamination of the plate-shaped members. With this operation, the work efficiency of the cleaning can be improved.

In particular, in the case of a beam-down type solar thermal power generation plant, the orientation of the heliostats, each of which is a reflecting mirror, is different from one to another of the working areas. For this reason, for example, when sand dusts adhere to the heliostats under the influence of wind or the like, the degree of contamination varies depending on the orientation of the heliostats. Therefore, in order to perform the cleaning work efficiently in accordance with priority order, selection of the working areas to which the groups are allocated is important, in other words, the existence of the management robot is important.

It should be noted that, a worker may be engaged in place of the management robot and the arranging robots or may work as part of the cleaning robot system. Specifically, in a case, for example, where it becomes difficult for the arranging robots to travel due to destruction or the like of part of a traveling road surface for the arranging robots, the movement of the cleaning robots in the corresponding region can be performed by the worker. In addition, in a case where such a work as inspection of reflecting mirrors is being performed in a region, and the cleaning is thus to be performed exclusive of the region, destination regions for the groups may be selected upon determination made by a person instead of the management robot.

A method of controlling a cleaning robot system according to the present invention for achieving the above-described object is a method of controlling a cleaning robot system in which a group is organized by one of the arranging robots and a plurality of the cleaning robots, and cleaning is performed by a plurality of the groups. The method is characterized in that the plurality of groups perform a cleaning work respectively in working areas allocated to the groups from among a plurality of the working areas, and further, each of the groups performs: a first control to receive an instruction indicating a next working area upon completion of the cleaning work in the working area allocated thereto; and a second control for each of the arranging robots to move the cleaning robot that has completed the cleaning of a plate-shaped member allocated thereto in the working area to another plate-shaped member for which cleaning is not completed yet. This configuration makes it possible to achieve the same operational effects as those of the above-described cleaning robot system.

The above-described method of controlling a cleaning robot system is characterized in that, when any one of the groups is moved to another one of the working areas, the first control and the second control are simultaneously performed.

This configuration enables the control in two stages of the first control to control the arranging robots and the second control for each of the arranging robots to control the cleaning robots. With this configuration, in a case where the first control and the second control have to be performed simultaneously in parallel, the arranging robot that has received a moving instruction for a working area can perform the control to sequentially move the cleaning robot that has completed the cleaning of the plate-shaped member to the plate-shaped member of the next working area.

This control makes it possible to perform the change of the working areas more efficiently in a shorter time than a case where the cleaning robots are moved upon completion of the cleaning of all the plate-shaped members in the corresponding working area. In other words, as compared with a method in which a group is moved to a second working area after completing all the cleaning work in a first working area, the above-described control increases a period of time during which almost all the cleaning robots continue their cleaning work with no interruption because there is a transition period of time during which the cleaning work is being conducted both in the first working area and the second working area. For this reason, the work efficiency of the entire cleaning work can be improved.

The above-described method of controlling a cleaning robot system is characterized in that, the first control is performed by a management robot, and the management robot instructs the plurality of arranging robots on the allocation of the working areas.

With this configuration, even if an increase in the scale of a photovoltaic power generation or solar thermal power generation plant is advanced, the cleaning work can be efficiently conducted. Specifically, the cleaning work itself is conducted basically by the robots, and a worker only has to monitor the cleaning work and to deal with an emergency. As a result, the workability and economy of the cleaning work can be improved.

Effects of the Invention

According to the cleaning robot system and the method of controlling the same of the present invention, the cleaning robot system and the method of controlling the same are configured so that plate-shaped members, such as solar cell panels and reflecting mirrors (heliostats) used in photovoltaic power generation and solar thermal power generation systems, are cleaned by at least two types of robots, that is, the cleaning robot having the functions to clean the plate-shaped members and to travel on the surfaces of the plate-shaped members, and the arranging robot having the function to move the cleaning robot from a first plate-shaped member to a different second plate-shaped member. This makes it possible to improve the work efficiency of the cleaning work and also improve the economy.

BEST MODES FOR CARRYING OUT THE INVENTION

Figure 1:
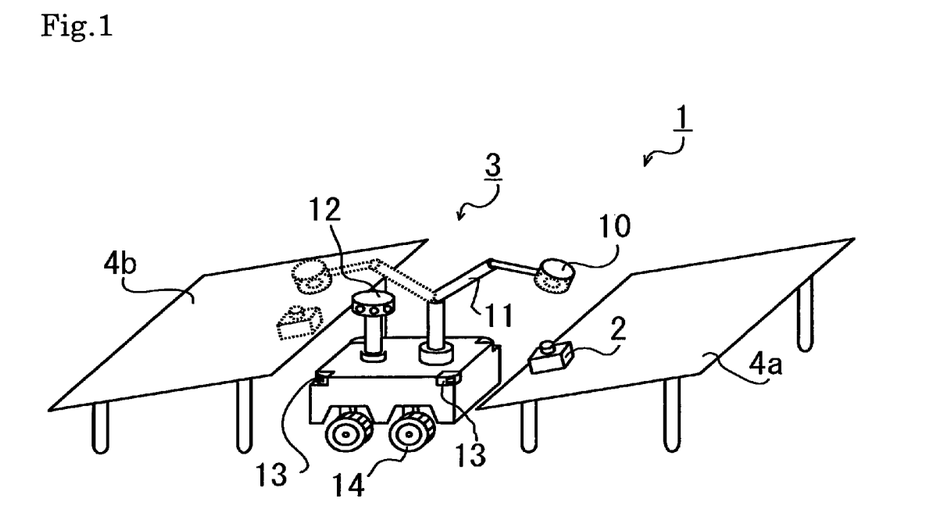
FIG. 1 is a schematic view showing a configuration of a cleaning robot system of an embodiment according to the present invention.

Hereinafter, a cleaning robot system of an embodiment according to the present invention and a method of controlling the same will be described with reference to the drawings. FIG. 1 shows a configuration of the cleaning robot system of the embodiment according to the present invention.

The cleaning robot system 1 includes: a cleaning robot 2 for cleaning plate-shaped members 4a, 4b, such as panels for photovoltaic power generation or reflecting mirrors for solar thermal power generation, for example, which are to be cleaned; an arranging robot 3 for moving the cleaning robot 2 from the first plate-shaped member 4a to the second plate-shaped member 4b. The cleaning robot 2 has, for example, a device configured to spray water, a cleaning liquid, and the like for cleaning, and a cleaning function to clean a surface of each of the plate-shaped members 4 with a rotary brush or the like, and also has a traveling function to travel on the surface of each of the plate-shaped members 4.

The arranging robot 3 has, at a distal end of a robot arm 11, a gripping adaptor 10 for moving the cleaning robot 2 from the first plate-shaped member 4a to the second plate-shaped member 4b. The arranging robot 3 can grip the cleaning robot 2 with the gripping adaptor 10, and move the cleaning robot 2 to another plate-shaped member 4. In addition, when the cleaning robot system of the present invention is operated in a power generation plant or the like, a large number of the cleaning robots 2 and a smaller number of the arranging robots 3 than that of the cleaning robots 2 are used. For this reason, each of the arranging robots 3 conducts its operation by running among the plate-shaped members 4 in the power generation plant. Therefore, each arranging robot 3 has running wheels 14 and means, such as a 3D laser scanner, for measuring a distance to a surrounding object at each of the four corners of the robot body. Each arranging robot 3 may employ crawlers (caterpillars) or moving legs instead of the running wheels 14. Further, the arranging robot 3 has an omnidirectionally-movable camera 12 capable of tilting, rotating, expanding and contracting, and the like.

Each of the plate-shaped members 4 is a panel for photovoltaic power generation (solar cell or the like), and has a size of 10 m in width, 10 m in depth, and 1 m to 8 m in height. For this reason, there is a problem that, if each of the cleaning robots 2 is provided with a structure for moving between panels (plate-shaped members), the cleaning robot 2 inevitably has to be increased in size. In this regard, in the present invention, functions are divided into the cleaning robot 2 for cleaning each plate-shaped member 4 and the arranging robot 3 for moving the cleaning robot 2 onto the next different plate-shaped member 4 after the completion of cleaning. This functional division makes it possible to achieve a necessary and sufficient performance with the cleaning robot 2 and the arranging robot 3 each having the necessary minimum size, weight, and power.

Specifically, the cleaning robot 2 may be configured of a robot that is dedicated and specialized to cleaning work, like being relatively small in size and weight and capable of performing an essentially necessary cleaning work and moving at such a speed as to maintain necessary working efficiency. Although being incapable of moving onto another plate-shaped member 4, the cleaning robot 2 can be designed optimally in a simple form, by leaving the moving operation to the arranging robot 3. On the other hand, the arranging robot 3 can dedicate itself to high-level functions, such as transport, work management, and communications, by leaving the delicate cleaning work to the cleaning robot 2.

Moreover, the arranging robot 3 may be equipped with tanks of water, a cleaning liquid, and the like, to be configured to supply the water and the cleaning liquid to a supply port included in the cleaning robot through the gripping adaptor 10 when gripping and moving the cleaning robot 2 with the gripping adaptor 10. Similarly, the arranging robot 3 may be configured to supply energy, such as electric power, to the cleaning robot for the movement and cleaning thereof.

With this configuration, the cleaning robot 2 may be equipped with tanks of water, a cleaning liquid, and the like, only at least in volumes necessary for cleaning one plate-shaped member 4. Accordingly, the cleaning robot 2 can be further reduced in size. Moreover, the opportunity for supplying energy to the cleaning robot 2 is increased. For this reason, when the energy source is electricity, for example, the battery of the cleaning robot can be reduced in size, and when the energy source is a fossil fuel, the fuel tank of the cleaning robot can be reduced in size.

In this configuration, the supply of water or the like may be achieved as follows without using the gripping adaptor 10. For example, a dock for housing the cleaning robot 2 is provided in the inside, or on the upper surface, of the arranging robot 3, and supply equipment for supplying water, a cleaning liquid, or the like, and for electric charging is provided together with the dock.

Alternatively, the arranging robot may have such a system that the arranging robot carries a spare of the cleaning robot, and the cleaning robot is entirely replaced with the spare instead of performing the supply of water, a cleaning liquid, electric charging, and the like. In this case, the arranging robot performs the supply of water and a cleaning liquid and the electric charging on a recovered cleaning robot by utilizing a time for replacement and transfer of the next cleaning robot. This makes it possible to reduce the time taken for the entire work.

Figure 2:
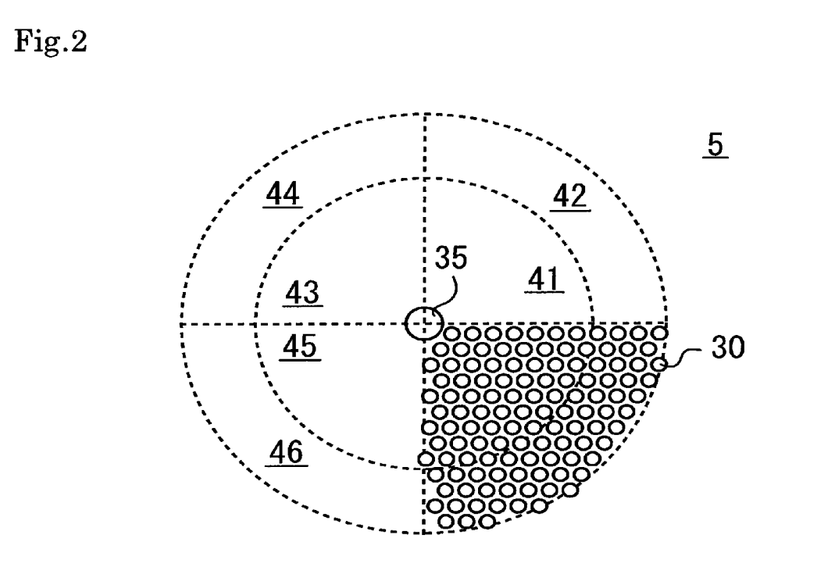
FIG. 2 is a plan view of a beam-down type solar thermal power generation system.

FIG. 2 shows a plan view of a beam-down type solar thermal power generation plant 5, in which a large number of heliostats 30 are arranged around a center reflector 35. In the drawing, the heliostats 30 are illustrated only in a part of the power generation plant 5. However, the heliostat 30 are generally arranged around the reflector 35 over 360 degrees while the density of the arrangement may vary. In addition, the power generation plant 5 is illustrated while being divided into eight working areas (a first working area 41, a second working area 42, a third working area 43, and so on) in conjunction with control of the cleaning robot system 1.

The cleaning robot system 1 of the present invention is configured in such a manner that a single group is constituted of one arranging robot 1 described above and multiple cleaning robots (for example 5 to 20 cleaning robots) described above, and at least one group performs the cleaning work in the power generation plant 5. The arranging robot may be operated remotely by an operator in a management center. However, the arranging robot 3 has to be capable of autonomously operating the work in such a large-scale system as including several tens of thousands of plate-shape members, 10 or more arranging robots described above, and 100 or more cleaning robots described above, while a small-scale power generation plant is set aside.

Specifically, the arranging robot 3 monitors the cleaning robot 2 or grasps the working status of the power generation plant by receiving wireless communications. When the cleaning robot 2 completes the cleaning work of the first plate-shaped member 4a, the arranging robot 3 grips the cleaning robot 2 and moves the cleaning robot 2 to the second plate-shaped member 4b. When moving the cleaning robot 2 to a new plate-shape member 4, the arranging robot 3 may sometimes press the cleaning robot against the plate-shaped member 4 with a specific force in order to securely attach the cleaning robot 2 to the plate-shape member 4.

In addition, the electric charging and the supply of water and a cleaning liquid for the cleaning robot 2 are required on a regular basis. For these works, it is required to make and execute a work plan by grasping all the surrounding environment conditions, such as the position and posture of the cleaning robot 2, the position of the plate-shaped member 4, and the conditions of the ground surface. This basically is functions of what is called as an intelligent robot or an autonomous robot, and requires such elemental technologies as environmental recognition, judgment, motion control, and external communications. The current robot technologies are in such a situation as to be capable of achieving these functions; therefore, the arranging robot 3 as an intelligent robot can be achieved.

There is described an example of a method of controlling a cleaning robot system including: two groups, each of which is constituted of one arranging robot 3 and 15 cleaning robots 2; and a single management robot that manages the groups, for the eight working areas shown in FIG. 2. The management robot is configured to manage the arranging robot 3 in place of the operator, who was performed the management in the central management center, and contributes to an increase in the scale and automation of a cleaning robot system.

The cleaning work is started by arranging the first group and the second group respectively in the first working area 41 and the second working area 42. The arranging robot 3 in each group moves the cleaning robot 2 that has completed the cleaning work to another one of the plate-shaped members 4 in the corresponding working area. In this event, such a control that the distance of movement of the arranging robot 3 should be the minimum in the working area makes it possible to increase the number of the cleaning robots 2 that each single arranging robot 3 can manage.

Before the cleaning of all the plate-shaped members 4 in the designated working area is completed, the arranging robot communicates with the management robot to receive an instruction regarding which working area to move to next. Then, if intervals between times at which the respective cleaning robots 2 are supposed to complete their works are large, the arranging robot 3 starts to move the cleaning robot 2 that the arranging robot 3 is currently gripping to the next working area. To put it differently, there is a work-region transition state where the cleaning robots 2 in the same group are performing the cleaning work in different working areas. This judgment is made by the arranging robot 3 or the management robot, so that the transition between the working areas is executed.

Moreover, the management robot determines a working area of the next destination in such a manner that the total of distances of movement of the multiple arranging robots managed by the management robot is the minimum. In particular, in the case of a solar thermal power generation plant, the number of heliostats is sometimes different from one working area to another. To be specific, this is such a case where a smaller number of the heliostats 35 are placed in an area that is located to the north of the center reflector 35 and is shaded by the center reflector 35.

Furthermore, if the number of working areas is increased along with an increase in the scale of a power generation plant, the cleaning robot system may be configured in such a manner that a single management robot manages multiple groups. The management robot may be a computer installed in the central management center or a robot movable in a power generation plant.

EXPLANATION OF REFERENCE NUMERALS 1 cleaning robot system
2 cleaning robot
3 arranging robot
4a first plate-shaped member
4b second plate-shaped member
5 beam-down type solar thermal power generation plant

The invention claimed is:

1. A cleaning robot system for cleaning planar or curved plate-shaped members that are panels for photovoltaic power generation or reflecting mirrors for solar thermal power generation, the system characterized by comprising:
 a large number of cleaning robots each having a function to travel on each of the plate-shaped members which are to be cleaned and a function to clean the plate-shaped members; and
 an arranging robot having a conveying function to move any of the cleaning robots from a first plate-shaped member to a second plate-shaped member,
 the system characterized in that
 each of the cleaning robots has a suction mechanism for performing cleaning while attaching onto one of the plate-shaped members, and
 the large number of cleaning robots and a smaller number of the arranging robots than that of the cleaning robots cooperate together to clean the plate-shaped members placed in a photovoltaic power generation or solar thermal power generation plant.

2. The cleaning robot system according to claim 1, characterized in that the suction mechanism is a vacuum suction mechanism for attaching the corresponding cleaning robot onto any of the plate-shaped members by generating a negative pressure between the cleaning robot and the plate-shaped member.

3. The cleaning robot system according to claim 1, characterized in that the arranging robot has a supply equipment function to supply any of the cleaning robots with water and a cleaning liquid for cleaning the plate-shaped members and energy for traveling and cleaning.

4. The cleaning robot system according to claim 1, characterized by comprising:
 a group constituted of one of the arranging robots and a plurality of the cleaning robots; and
 an aggregation of a plurality of the groups and a management robot managing the plurality of groups,
 the system characterized in that the cleaning of the plate-shaped members in working areas defined in advance within the photovoltaic power generation or solar thermal power generation plant is performed by the aggregation.

5. The cleaning robot system according to claim 2, characterized in that the arranging robot has a supply equipment function to supply any of the cleaning robots with water and a cleaning liquid for cleaning the plate-shaped members and energy for traveling and cleaning.

6. The cleaning robot system according to claim 2, characterized by comprising:
 a group constituted of one of the arranging robots and a plurality of the cleaning robots; and
 an aggregation of a plurality of the groups and a management robot managing the plurality of groups,
 the system characterized in that the cleaning of the plate-shaped members in working areas defined in advance within the photovoltaic power generation or solar thermal power generation plant is performed by the aggregation.

7. The cleaning robot system according to claim 3, characterized by comprising:

a group constituted of one of the arranging robots and a plurality of the cleaning robots; and an aggregation of a plurality of the groups and a management robot managing the plurality of groups, the system characterized in that the cleaning of the plate-shaped members in working areas defined in advance within the photovoltaic power generation or solar thermal power generation plant is performed by the aggregation.

* * * * *